(12) United States Patent
Altamura

(10) Patent No.: US 11,002,318 B2
(45) Date of Patent: May 11, 2021

(54) OUTPUT ASSEMBLY FOR AN ACCESSORY GEARBOX OF A GAS TURBINE ENGINE

(71) Applicant: GE Avio Srl, Rivalta di Torino (IT)

(72) Inventor: Paolo Altamura, Monopoli (IT)

(73) Assignee: GE AVIO S.R.L., Rivalta di Torino (IT)

( * ) Notice: Subject to any disclaimer, the term of this patent is extended or adjusted under 35 U.S.C. 154(b) by 69 days.

(21) Appl. No.: 15/906,278

(22) Filed: Feb. 27, 2018

(65) Prior Publication Data
US 2018/0283464 A1 Oct. 4, 2018

(30) Foreign Application Priority Data
Mar. 28, 2017 (EP) ..................................... 17425038

(51) Int. Cl.
*F02C 7/32* (2006.01)
*F16D 9/08* (2006.01)
(Continued)

(52) U.S. Cl.
CPC ............... *F16D 9/08* (2013.01); *F01D 25/36* (2013.01); *F02C 7/32* (2013.01); *F02C 7/36* (2013.01); *F16D 41/185* (2013.01); *F16H 35/10* (2013.01); *F02C 3/04* (2013.01); *F05D 2220/323* (2013.01); *F05D 2260/311* (2013.01); *F05D 2260/4031* (2013.01); *F16D 41/069* (2013.01);
(Continued)

(58) Field of Classification Search
CPC ...... F02C 7/32; F02C 7/36; F16D 9/08; F16D 41/185
See application file for complete search history.

(56) References Cited

U.S. PATENT DOCUMENTS 2,942,481 A * 6/1960 Gilbert .................... F02C 7/275
74/7 C
2,951,570 A * 9/1960 Antrim, Jr. ............. F16D 41/07
192/101
(Continued)

FOREIGN PATENT DOCUMENTS

DE 19653962 A1 6/1998
EP 3075966 A1 3/2016
WO 2016063248 A1 4/2016

OTHER PUBLICATIONS

European Search Report issued in connection with corresponding EP application No. 174250381 dated Sep. 21, 2017.

*Primary Examiner* — David E Sosnowski
*Assistant Examiner* — Wesley Le Fisher
(74) *Attorney, Agent, or Firm* — Dority & Manning, P.A.

(57) ABSTRACT

An output assembly for an accessory system of a gas turbine engine includes a first rotating member extending along an axis and including a mechanical connector for coupling the output assembly to an accessory system. The output assembly also including a second rotating member extending along the axis, the second rotating member coupled to the first rotating member at a first axial position and at a second axial position, the second rotating member coupled to the first rotating member at the second axial position through a one-way clutch. Additionally, the first rotating member of the output assembly further includes an extension member extending at least partially between the first axial position and the second axial position, the extension member including a designed fail point.

20 Claims, 8 Drawing Sheets

(51) Int. Cl.
- *F02C 7/36* (2006.01)
- *F01D 25/36* (2006.01)
- *F16D 41/18* (2006.01)
- *F16H 35/10* (2006.01)
- *F02C 3/04* (2006.01)
- *F16D 41/069* (2006.01)
- *F16H 1/22* (2006.01)

(52) U.S. Cl.
CPC ........ *F16H 1/222* (2013.01); *F16H 2035/103* (2013.01)

(56) References Cited

U.S. PATENT DOCUMENTS

| | | | | |
|---|---|---|---|---|
| 2,964,931 A | * | 12/1960 | Sorenson | F16D 9/00 464/32 |
| 3,220,218 A | | 11/1965 | Rio et al. | |
| 3,365,614 A | | 1/1968 | Luongo et al. | |
| 4,543,074 A | * | 9/1985 | Ville | F16D 9/06 192/56.53 |
| 4,768,634 A | * | 9/1988 | Quick | F16D 41/22 192/150 |
| 4,871,296 A | * | 10/1989 | Laessle | F02C 7/277 415/123 |
| 5,210,704 A | | 5/1993 | Husseiny | |
| 5,319,989 A | | 6/1994 | Burch | |
| 5,831,429 A | | 11/1998 | Germanetti | |
| 6,059,085 A | * | 5/2000 | Farnsworth | F16D 9/08 192/55.1 |
| 6,175,793 B1 | | 1/2001 | Ironside | |
| 8,364,424 B2 | | 1/2013 | Lou et al. | |
| 8,515,640 B2 | | 8/2013 | Monti et al. | |
| 2007/0000746 A1 | * | 1/2007 | Guyader | F16D 7/044 192/55.1 |
| 2009/0199567 A1 | * | 8/2009 | Gockel | F02C 7/275 60/788 |
| 2012/0118103 A1 | * | 5/2012 | Blewett | F02C 7/277 74/7 C |
| 2016/0178464 A1 | | 6/2016 | Burns et al. | |
| 2018/0010648 A1 | * | 1/2018 | Slayter | F01D 15/12 |

\* cited by examiner

OUTPUT ASSEMBLY FOR AN ACCESSORY GEARBOX OF A GAS TURBINE ENGINE

FIELD

The present subject matter relates generally to an output assembly for an accessory system of a gas turbine engine, and a method of using the same.

BACKGROUND

Typical aircraft propulsion systems include one or more gas turbine engines. For certain propulsion systems, the gas turbine engines generally include a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

Gas turbine engines conventionally include an accessory gearbox to run various accessory systems of the gas turbine engine. For example, the accessory gearbox may provide power to, or receive power from, a lubrication oil system, an electric starter/generator, etc. Typically, these accessory systems are rigidly coupled to an accessory gear of the accessory gearbox, such that rotation of the accessory gear necessarily rotates the accessory system. However, for accessory systems configured to transfer power into the accessory gearbox, e.g., at lower power levels, such may lead to inefficiencies with the accessory system and/or a reduction in a lifespan of the accessory system. Accordingly, a means for attaching an accessory system to an accessory gearbox to ensure power and/or torque over a desired threshold is not transferred back to the accessory system would be useful.

BRIEF DESCRIPTION

Aspects and advantages of the invention will be set forth in part in the following description, or may be obvious from the description, or may be learned through practice of the invention.

In one embodiment of the present disclosure, an output assembly for an accessory system of a gas turbine engine is provided. The gas turbine engine includes an accessory gearbox and the output assembly defining an axis. The output assembly includes a first rotating member extending along the axis and including a mechanical connector for coupling the output assembly to the accessory system. The output assembly also including a second rotating member extending along the axis, the second rotating member coupled to the first rotating member at a first axial position and at a second axial position, the second rotating member coupled to the first rotating member at the second axial position through a one-way clutch. Additionally, the first rotating member of the output assembly further includes an extension member extending at least partially between the first axial position and the second axial position, the extension member including a designed fail point.

In certain exemplary embodiments, the designed fail point is a shear neck.

In certain exemplary embodiments, the one-way clutch is formed at least in part by the first rotating member and at least in part by the second rotating member. For example, in certain exemplary embodiments the one-way clutch is configured as a dog clutch. Additionally, or alternatively, in certain exemplary embodiments the second rotating member defines an opening, wherein the extension member of the first rotating member extends through the opening, and wherein the output assembly further includes a spring member attached to the extension member and pressing together the one-way clutch formed by the first and second rotating members.

In certain exemplary embodiments, the second rotating member comprises a mechanical connector for coupling the output assembly to the accessory gearbox. For example, in certain exemplary embodiments the mechanical connector of the first rotating member is configured as a spline, wherein the mechanical connector of the second rotating member is also configured as a spline.

In certain exemplary embodiments, the designed fail point defines a torque limit of less than about thirty Newton-meters.

In certain exemplary embodiments, the output assembly defines a first torque limit when the first rotating member is rotated in a first circumferential direction by the accessory system, wherein the output assembly defines a second torque limit when the second rotating member is rotated in the first circumferential direction by an accessory gear of the accessory gearbox, and wherein the first torque limit is greater than the second torque limit. For example, in certain exemplary embodiments, the first torque limit is greater than thirty Newton-meters, and the second torque limit is less than thirty Newton-meters.

In certain exemplary embodiments, the second rotating member is slidably coupled along the axis to the first rotating member at the first axial position.

In another exemplary embodiment of the present disclosure, a gas turbine engine is provided. The gas turbine engine includes a compressor section and a turbine section, an accessory gearbox mechanically coupled to one or more components of the compressor section or the turbine section, and an output assembly for an accessory system of the gas turbine engine. The output assembly defines an axis and includes a first rotating member extending along the axis and including a mechanical connector for coupling the output assembly to the accessory system. The output assembly also includes a second rotating member extending along the axis and including a mechanical connector coupling the output assembly to the accessory gearbox, the second rotating member coupled to the first rotating member at a first axial position and at a second axial position, the second rotating member coupled to the first rotating member at the second axial position through a one-way clutch. Additionally, the first rotating member of the output assembly further includes an extension member extending at least partially between the first axial position and the second axial position, the extension member including a designed fail point.

In certain exemplary embodiments, the designed fail point is a shear neck.

In certain exemplary embodiments, the one-way clutch is formed at least in part by the first rotating member and at least in part by the second rotating member.

In an exemplary aspect of the present disclosure, a method of operating an accessory system of a gas turbine engine is provided. The method includes applying a first amount of torque with an accessory system to an output assembly in a circumferential direction to rotate an accessory gear of an accessory gearbox. The method also includes applying a second amount of torque with the accessory gear of the accessory gearbox to the output assembly in the circumferential direction, the first and second amounts of torque each being greater than or equal to a torque limit. The method also includes shearing a portion of the output assembly in response to the application of the second amount of torque to the output assembly in the circumferential direction.

In certain exemplary aspects, the first amount of torque is greater than the second amount of torque.

In certain exemplary aspects, applying the first amount of torque with the accessory system to the output assembly comprises transferring substantially the first amount of torque from a second rotating member of the output assembly to a first rotating member of the output assembly through a one-way clutch.

In certain exemplary aspects, shearing the portion of the output assembly in response to the application of the second amount of torque with the accessory gear to the output assembly in the circumferential direction includes shearing an extension member of the first rotating member at a designed fail point. For example, in certain exemplary aspects, the designed fail point is a shear neck.

In certain exemplary aspects, the method further includes applying a third amount of torque with the accessory gear of the accessory gearbox to the output assembly in the circumferential direction subsequent to shearing the portion of the output assembly such that a second rotating member of the output assembly rotates in the circumferential direction relative to a first rotating member of the output assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
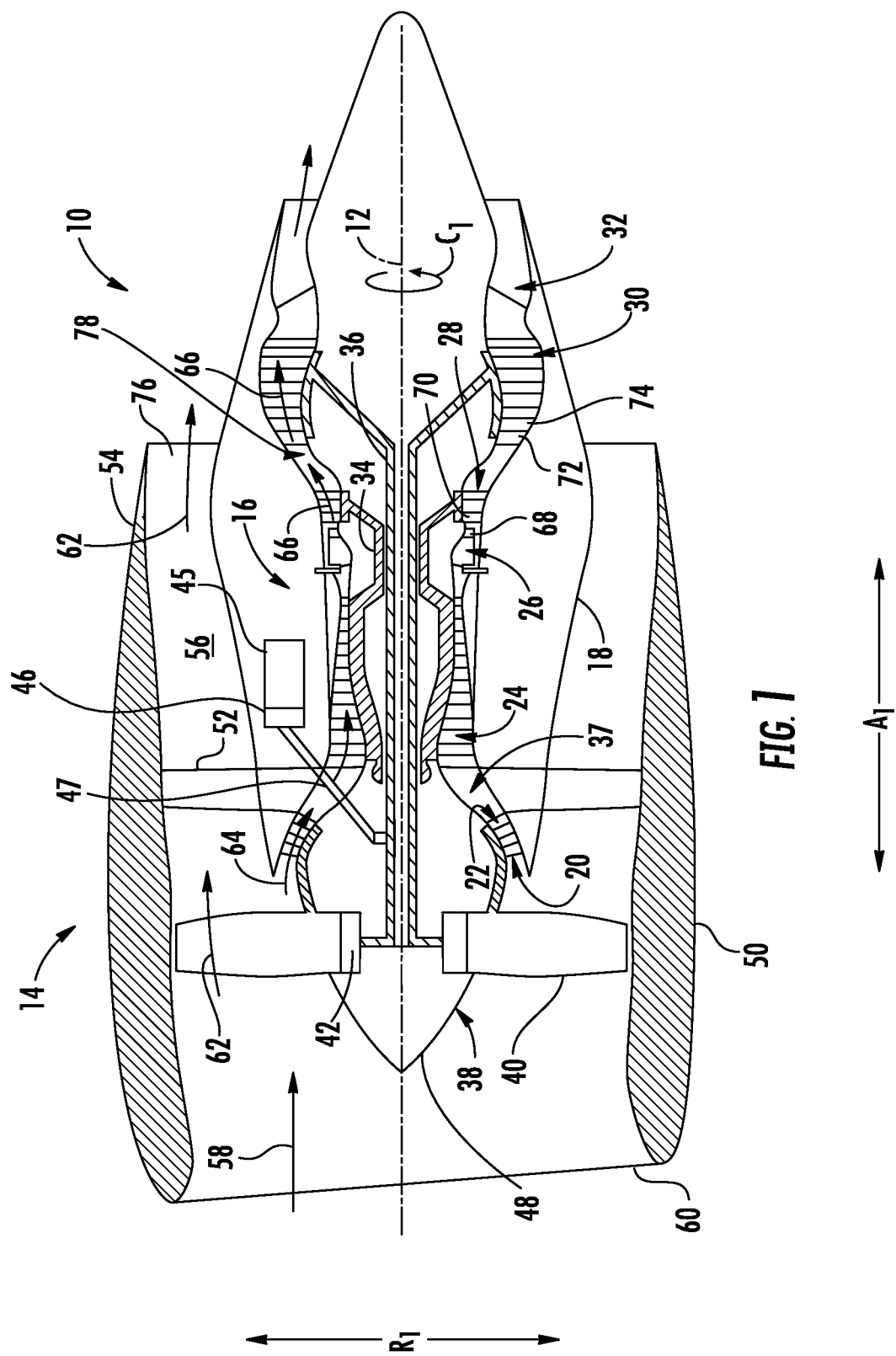
FIG. 1 is a schematic, cross-sectional view of a gas turbine engine in accordance with an exemplary embodiment of the present disclosure.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10% margin. Here and throughout the specification and claims, range limitations are combined and interchanged, such ranges are identified and include all the sub-ranges contained therein unless context or language indicates otherwise.

As used herein, the terms "processor" and "computer," and related terms, e.g., "processing device," "computing device," and "controller", are not limited to just those integrated circuits referred to in the art as a computer, but further broadly refers to one or more processing devices including one or more of a microcontroller, a microcomputer, a programmable logic controller (PLC), an application specific integrated circuit, and other programmable circuits, and these terms are used interchangeably herein. In the embodiments described herein, the computer or controller may additionally include memory. The memory may include, but is not limited to, a computer-readable medium, such as a random access memory (RAM), a computer-readable non-volatile medium, such as a flash memory. Alternatively, a floppy disk, a compact disc-read only memory (CD-ROM), a magneto-optical disk (MOD), and/or a digital versatile disc (DVD) may also be used. Also, in the embodiments described herein, the computer or controller may include one or more input channels and/or one or more output channels. The input channels may be, but are not limited to, computer peripherals associated with an operator interface such as a mouse and a keyboard, or sensors, such as engine sensors associated with an engine, such as a gas turbine engine, for determining operating parameters of the engine. Furthermore, in the exemplary embodiment, the output channels may include, but are not limited to, an operator interface monitor. Further, the memory may store software or other instructions, which when executed by the controller or processor allow the controller to perform certain operations or functions, such as one or more of the functions described in the method 300, below. The term "software" may include any computer program stored in memory, or accessible by the memory, for execution by, e.g., the controller, processor, clients, and servers.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A1 (extending parallel to a longitudinal centerline 12 provided for reference), a radial direction R1, and a circumferential direction C1 (i.e., a direction extending about the axial direction A1). In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, and turbine section together define at least in part a core air flowpath 37 of the turbofan engine 10. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a fan 38 having a plurality of fan blades 40 coupled to a disk 42 in a spaced apart manner. As is depicted, the fan blades 40 extend outwardly from disk 42 generally along the radial direction R1. The disk 42 is covered by rotatable front nacelle 48 aerodynamically contoured to promote an airflow through the plurality of fan blades 40. The fan blades 40 and disk 42 are together rotatable about the longitudinal axis 12 by LP shaft 36.

As is depicted, the exemplary turbofan engine 10 further includes an accessory gearbox 45 attached to the gas turbine engine and mechanically coupled to a spool of the gas turbine engine. More specifically, the accessory gearbox 45 is attached to the core turbine engine 16 of the turbofan engine 10, and is mechanically coupled to the LP spool 36 of the turbofan engine 10 through a transfer gearbox 46 and transfer shaft 47. Although not depicted, an electric machine (i.e., a starter motor/generator) may be coupled to the accessory gearbox 45 for, e.g., starting the turbofan engine 10 and/or generating electrical power once the turbofan engine 10 is running. It should be appreciated, however, that in other exemplary embodiments, the accessory gearbox 45 may instead be coupled to any other suitable section of the gas turbine engine, such as to the HP spool 34 of the turbofan turbine engine 10 depicted.

Referring still to the exemplary embodiment of FIG. 1, the exemplary fan section 14 includes an annular fan casing or outer nacelle 50 that circumferentially surrounds the fan 38 and/or at least a portion of the core turbine engine 16. The nacelle 50 is supported relative to the core turbine engine 16 by a plurality of circumferentially-spaced outlet guide vanes 52. Additionally, a downstream section 54 of the nacelle 50 extends over an outer portion of the core turbine engine 16 so as to define a bypass airflow passage 56 therebetween.

During operation of the turbofan engine 10, such as during flight operations of the turbofan engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It should be appreciated, however, that the exemplary turbofan engine 10 depicted in FIG. 1 is by way of example only, and that in other exemplary embodiments, the turbofan engine 10 may have any other suitable configuration. For example, in other exemplary embodiments, the turbofan engine 10 may be configured as a geared turbofan engine (i.e., including a reduction gearbox); may not include variable-pitch fan blades; may include any other suitable number of spools, compressors, or turbines; etc. Additionally, the turbofan engine 10 may instead be configured as any other suitable aeronautical gas turbine engine, such as a turboshaft engine, turboprop engine, turbojet engine, etc. Additionally, still, the turbofan engine 10 may instead be configured as an aeroderivative gas turbine engine (e.g., for nautical applications), an industrial gas turbine engine, or as any other suitable gas turbine engine.

Figure 2:
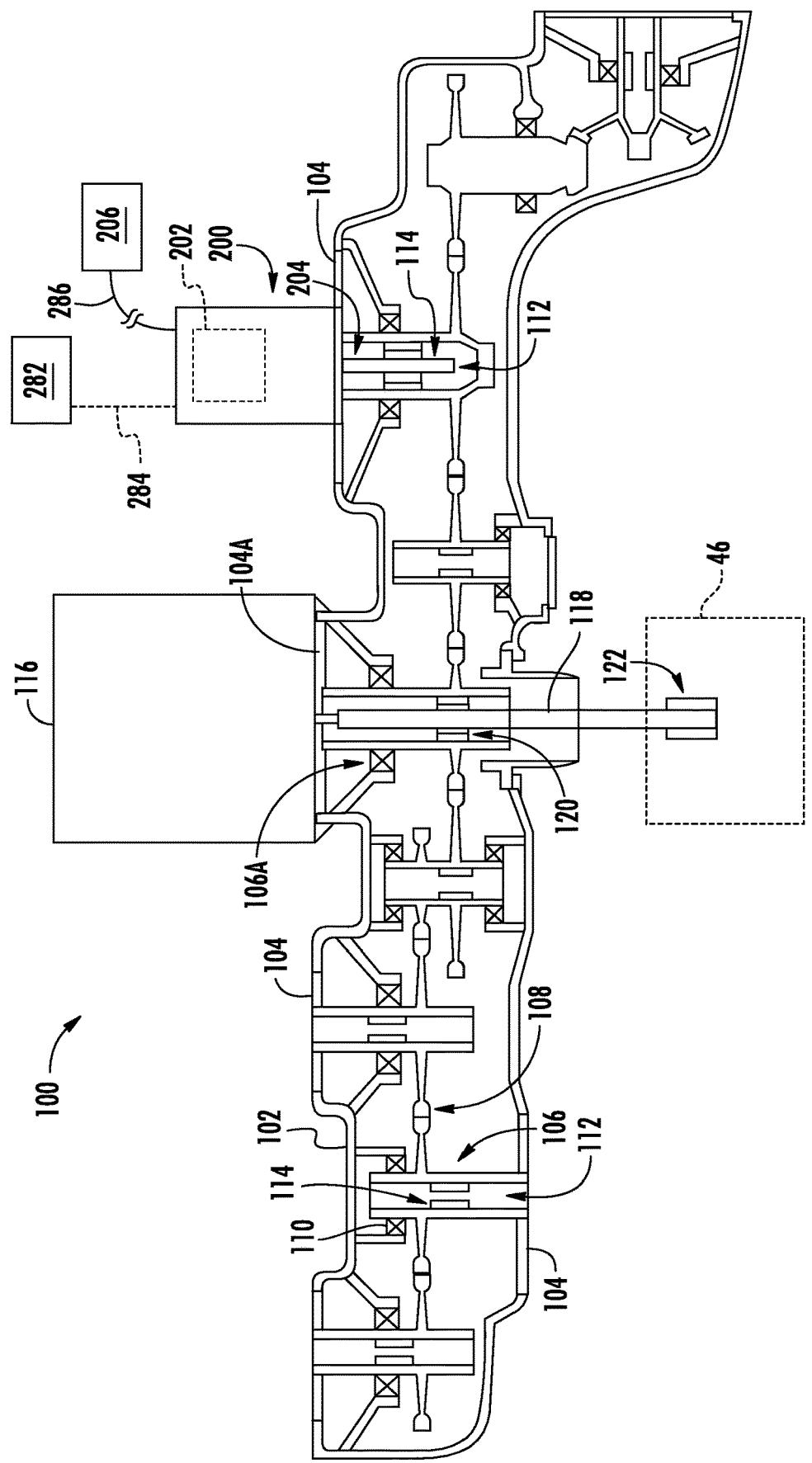
FIG. 2 is a schematic view of an accessory gearbox and a turning unit in accordance with an exemplary embodiment of the present disclosure.

Referring now to FIG. 2, a schematic view is provided of an exemplary accessory gearbox 100 for a gas turbine engine in accordance with an exemplary embodiment of the present disclosure. The accessory gearbox 100 of FIG. 2 may be configured to be attached to the exemplary turbofan engine 10 of FIG. 1, similar to the exemplary accessory gearbox 45 depicted in FIG. 1, or alternatively may be configured to be attached to any other suitable gas turbine engine.

As is depicted, the exemplary accessory gearbox 100 generally includes an outer casing 102 surrounding various internal components of the accessory gearbox 100. The accessory gearbox 100 may be attached to a gas turbine engine at an outer casing of the gas turbine engine, such as at or within the casing 18 of the turbine engine 10 (see FIG. 1). The accessory gearbox 100 additionally includes a plurality of accessory pads 104 positioned adjacent to a respective plurality of accessory gears 106. Each of the accessory gears 106 is mechanically coupled to one another through, e.g., meshing teeth 108 to transmit torque between the plurality of accessory gears 106. Additionally, each of the plurality of accessory gears 106 is supported within the outer casing 102 of the accessory gearbox 100 by one or more bearings 110. Moreover, for the exemplary embodiment depicted, each accessory gear 106 defines a cylindrical opening 112 with a splined portion 114 for coupling to the respective accessory systems (not all shown). For example, during operation of the gas turbine engine, accessory systems may be attached to the respective accessory pads 104 and may include a shaft extending into the accessory gearbox 100. The shafts of the accessory systems may extend through the respective cylindrical opening 112 and couple to the respective splined portion 114 in order to mechanically couple the accessory system to the respective accessory gear 106. Rotation of an accessory gear 106 may therefore correspondingly drive a respective accessory system. The accessory systems may include, for example, a lubrication oil system of the gas turbine engine, etc.

It should be appreciated, however, that in other exemplary embodiments the accessory gearbox 100 may include any other suitable configuration of accessory pads 104 and accessory gears 106. Additionally, in other exemplary embodiments, one or more of the plurality of accessory gears 106 may be coupled to a respective accessory system in any other suitable manner.

Referring particularly to the embodiment of FIG. 2, the accessory gearbox 100 may additionally be used to startup the gas turbine engine. For example, at least one of the accessory pads 104 and accessory gears 106 is a starter gear 106A and starter pad 104A. A starter motor/generator 116 is attached to the starter pad 104A and generally includes a driveshaft 118 that extends through the accessory gearbox 100 and mechanically couples to the starter gear 106A through a splined connection 120. Additionally, the driveshaft 118 of the starter motor/generator 116 includes a splined end 122 that couples to a transfer gearbox 46 (depicted in phantom). The transfer gearbox 46 is, in turn, mechanically coupled to the core turbine engine 16 (see, e.g., FIG. 1).

As will be appreciated, in at least certain exemplary embodiments, the one or more components of the compressor section or the turbine section of the gas turbine engine rotated by the starter motor/generator 116 during such startup operations may include a compressor of the compressor section and a turbine of the turbine section, such as the LP compressor 22 of the compressor section and the LP turbine 30 of the turbine section. By contrast, once the gas turbine engine is operating under its own power, rotational power may be transferred from the core turbine engine 16, through the transfer gearbox 46, through the driveshaft 118, to the starter gear 106A, and accordingly, to the starter motor/generator 116 and each of the additional accessory gears 106 and accessory systems. Such a configuration allows for the core turbine engine 16 to power the various accessory systems during operation of the gas turbine engine.

During flight operations of the gas turbine engine, a temperature of one or more components within the core turbine engine may be relatively elevated. For example, the LP shaft 36 may be at a relatively elevated temperature as a result of the combustion gases and high amount of air compression. Accordingly, subsequent to flight operations, under certain conditions, one or more of these components may be susceptible to "bowing" or other plastic deformation. More specifically, a weight of one or more of these components, in combination with the relatively elevated temperatures, may cause the component to deform.

In order to prevent or minimize a risk of the one or more components within the gas turbine engine deforming, the present disclosure includes a turning unit 200. As will be discussed in greater detail below, the turning unit 200 generally includes an electric motor 202 and an output assembly 204. In certain exemplary embodiments, the electric motor 202 may be, e.g., a three-phase electric motor. Additionally, the electric motor 202 may be a relatively small electric motor 202 configured to generate a maximum power of less than about fifty watts. For example, in certain exemplary embodiments, the electric motor 202 may be configured to generate a maximum power less than about forty watts, such as less than about thirty watts, such as less than about twenty watts. It should be appreciated, however, that in other exemplary embodiments, the electric motor 202 may instead be configured as a pneumatic or hydraulic motor.

Further, the output assembly 204 is mechanically coupled to the accessory gearbox 100 and the electric motor 202 is operable to rotate, through the output assembly 204 and accessory gearbox 100, one or more components of the compressor section or the turbine section of the gas turbine engine at a relatively low rotational speed during a shutdown condition of the gas turbine engine. For example, in certain exemplary aspects, the electric motor 202 may be configured to rotate one or more components of the compressor section or the turbine section at a rotational speed less than about fifty revolutions per minute, less than about twenty-five revolutions per minute, less than about ten revolutions per minute, less than about five revolutions per minute, or less than about two revolutions per minute during the shutdown condition of the gas turbine engine. It should be appreciated, that as used herein, a "shut down condition" of the gas turbine engine refers to any operating condition of the gas turbine engine in which the components, such as one or more of the compressors or turbines, are not being rotated by virtue of combustion gases flowing through the turbine section.

Moreover, as is also depicted in FIG. 2, it should be appreciated that for the embodiment depicted the electric motor 202 of the turning unit 200 is configured to be electrically connected to a ground power source 206. As used herein, "ground power source" refers to any source of power external to the gas turbine engine and an aircraft to which the gas turbine engine is attached or installed. Accordingly, the ground power source 206 may refer to a power source connected to an electrical grid, an external generator, or other external power source. Such a configuration may allow for the turning unit 200 to operate during the shutdown condition of the gas turbine engine where power is not being generated by the gas turbine engine. Notably, the electric motor 202 of the turning unit 200 may not be connected directly to the ground power source 206, and instead be connected to the ground power source 206 through an electrical system of the aircraft with which the gas turbine engine is installed (the electrical system of the aircraft being connected to the ground power source 206). Regardless of the configuration, however, the electric motor 202 of the turning unit 200 may be considered to be connected to the ground power source 206.

It should be appreciated, however, that in other exemplary embodiments, the electric motor 202 may instead be configured to be electrically connected to any other power source, such as a power source internal to the aircraft or gas turbine engine (e.g., an electrical power storage device, such as a battery).

Figure 3:
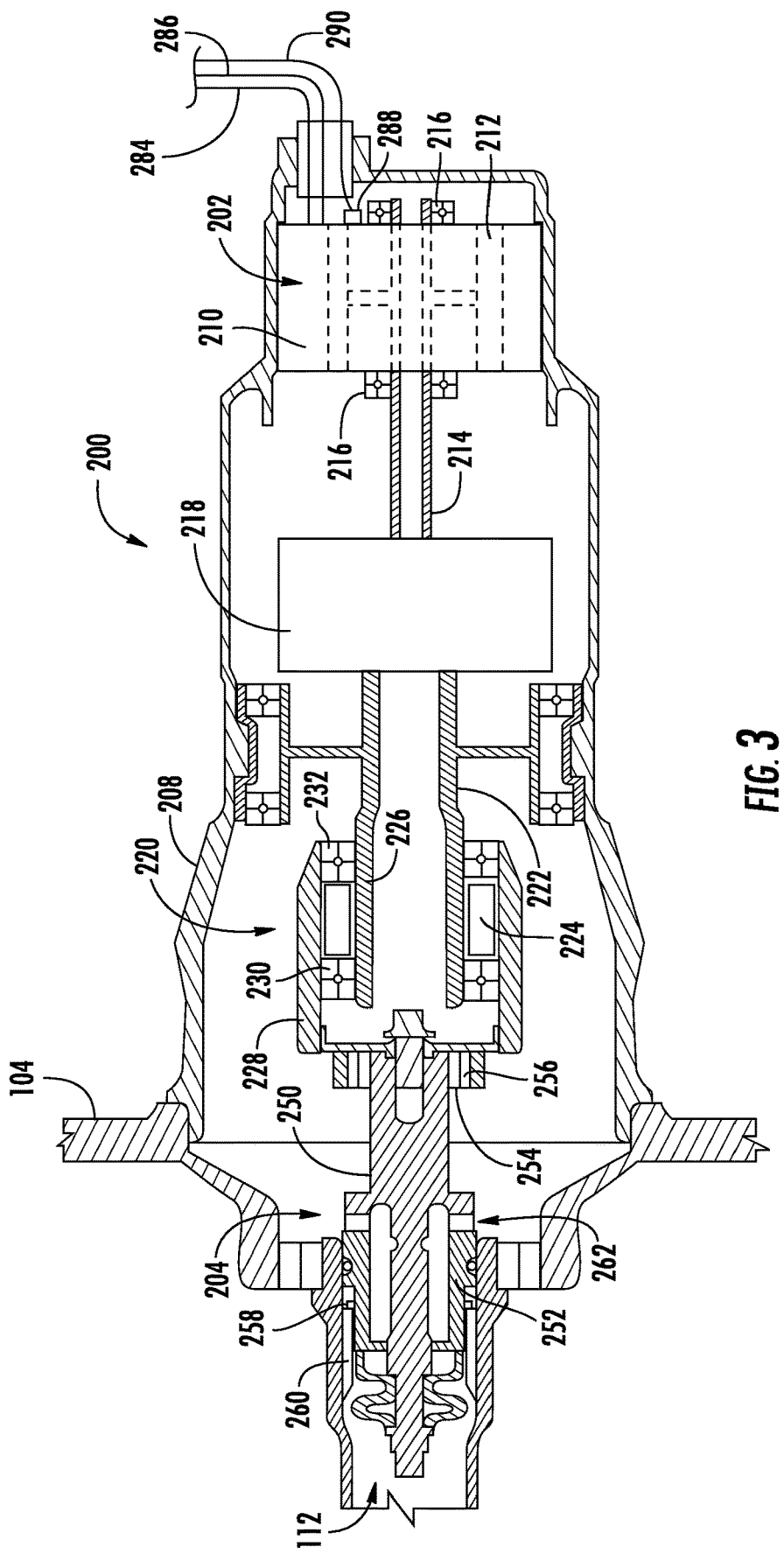
FIG. 3 is a close-up, cross-sectional view of the exemplary turning unit of FIG. 2.

Referring now to FIG. 3, a cross-sectional view of a turning unit 200 for a gas turbine engine in accordance with an exemplary embodiment of the present disclosure is provided. In certain exemplary embodiments, the turning unit 200 of FIG. 3 may be configured as the turning unit 200 described above with reference to FIG. 2. Accordingly, and as is depicted, the exemplary turning unit 200 of FIG. 3 generally includes an output assembly 204 configured to be mechanically coupled to the gas turbine engine and an electric motor 202 operable to rotate, through the output assembly 204, one or more components of the compressor section or the turbine section of the gas turbine engine at a relatively low rotational speed (described more fully above) during a shutdown condition of the gas turbine engine.

As is depicted, the turning unit 200 includes an outer casing 208 surrounding at least certain of the various components of the turning unit 200 and coupling the turning unit 200 to the accessory gearbox 100. More specifically, the outer casing 208 of the turning unit 200 is coupled to an accessory pad 104 of the accessory gearbox 100, such as one or more of the accessory pads 104 of the accessory gearbox 100 depicted in FIG. 2.

Additionally, the outer casing 208 surrounds and encloses the electric motor 202. The electric motor 202 is configured as an in-runner electric motor including a stator 210 and a rotor 212, the rotor 212 rotatable relative to the stator 210 and positioned at a location radially inward of the stator 210. However, in other exemplary embodiments, the electric motor 202 may instead be configured as an out-runner electric motor with the stator 210 instead positioned radially inward of the rotor 212. As will be discussed in greater detail below, the electric motor 202 is operably connected to a controller 282 of the turning unit 200 via, for the embodiment depicted, a wired connection 284, and is further operably connected to a power source, such as a ground power source 206, also via a wired connection 286.

Referring still to FIG. 3, the rotor 212 is attached to and rotatable with a first drive shaft, which for the embodiment depicted is an electric motor drive shaft 214. The electric motor drive shaft 214 is supported within the outer casing 208 of the turning unit 200 through the plurality of bearings 216. The bearings 216 may be one or more of ball bearings, roller bearings, tapered roller bearings, or any other suitable type of bearing.

As is also depicted in the exemplary embodiment of FIG. 3, the turning unit 200 additionally includes a reduction gearbox 218 and a primary one-way clutch 220. A second shaft 222 is provided within the outer casing 208, extending from the reduction gearbox 218 to the primary one-way clutch 220. The primary one-way clutch 220 is, in turn, connected to the output assembly 204. Accordingly, as will be appreciated, the output assembly 204 is rotatable by the electric motor 202 across the reduction gearbox 218, and further the electric motor 202 is mechanically connected to the output assembly 204 through the primary one-way clutch 220.

Referring particularly to the reduction gearbox 218, the reduction gearbox 218 may have any suitable configuration for reducing a rotational speed of the second shaft 222 relative to the electric motor drive shaft 214. For example, in certain exemplary embodiments, the reduction gearbox 218 may include an epicyclic gear set, such as a planetary gear set. As will be appreciated, the reduction gearbox 218 therefore allows for the electric motor 202 to rotate at a relatively high rotational speed, while turning the second shaft 222 and the various components of the gas turbine engine at a relatively low rotational speed. For example, in certain exemplary embodiments, the reduction gearbox 218 has a gear ratio at least about 100:1 (i.e., for every 100 rotations of the electric motor drive shaft 214, the second shaft 222 rotates once). However, in other exemplary embodiments, the reduction gearbox 218 may have an even higher gear ratio. For example, in other exemplary embodiments, the reduction gearbox 218 may have a gear ratio of at least about 150:1, of at least about 200:1, of at least about 250:1, of at least about 300:1, or of at least about 350:1.

Additionally, referring now specifically to the primary one-way clutch 220, as stated, the second shaft 222 and the electric motor 202 are mechanically connected to the output assembly 204 through the primary one-way clutch 220. The primary one-way clutch 220 is configured as a passive one-way clutch, as it automatically transfers rotational torque and power when the second shaft 222 is rotated in a first circumferential direction relative to the output assembly 204 and automatically prevents transfer of rotational torque and power when the second shaft 222 is rotated in a second circumferential direction (i.e., a circumferential direction opposite the first circumferential direction) relative to the output assembly 204, such as when the output assembly 204 is rotated more quickly than the second shaft 222.

Figure 4:
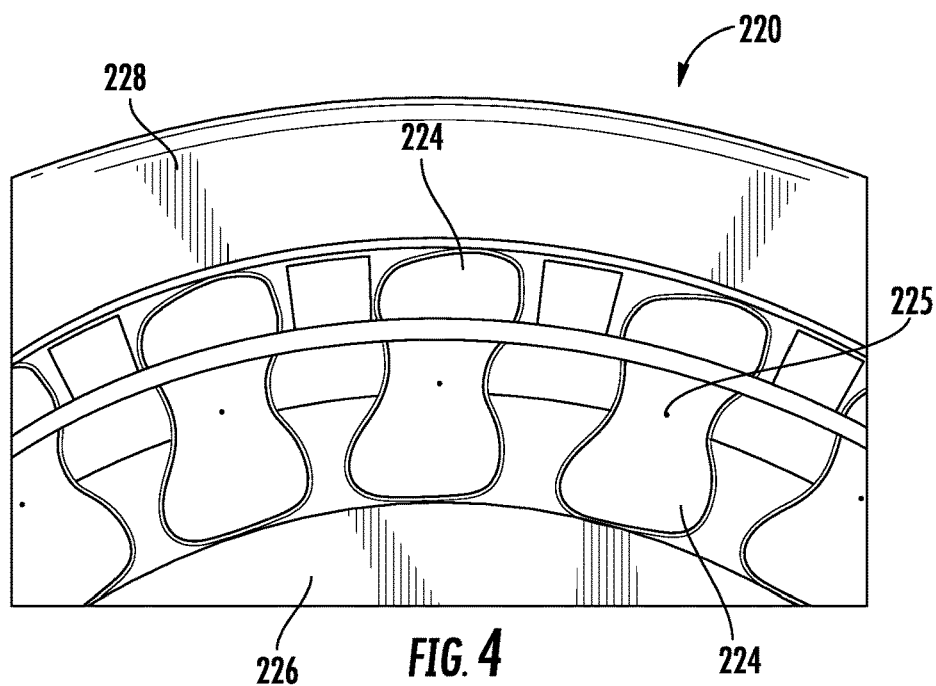
FIG. 4 is an axial view of a primary one-way clutch of the exemplary turning unit of FIG. 2 in accordance with an exemplary embodiment of the present disclosure.

More specifically, for the embodiment depicted, the primary one-way clutch 220 is configured as a sprag clutch. Referring briefly to FIG. 4, a schematic, axial view of the exemplary primary one-way clutch 220 is provided. The exemplary sprag clutch depicted includes a plurality of sprags 224 positioned between an inner race 226 and an outer race 228. The inner race 226 is fixed to, or formed integrally with, the second shaft 222 and the outer race 228 is coupled to the output assembly 204. When the inner race 226 rotates counterclockwise relative to the outer race 228 (at least for view of the embodiment depicted), the plurality of sprags 224 provide substantially no resistance to such movement. By contrast, when the inner race 226 attempts to rotate clockwise relative to the outer race 228, the plurality of sprags 224 rotate about each of their respective axes of rotation 225 and lock the inner race 226 to the outer race 228, such that no relative rotation of the inner race 226 to the outer race 228 in the clockwise direction is allowed. It should be appreciated, however, that in other embodiments, any other suitable primary one-way clutch 220 may be utilized.

As will be appreciated, inclusion of the primary one-way clutch 220 within the turning unit 200 may allow for the electric motor 202 to rotate one or more accessory gears 106 of the accessory gearbox 100 (and, in turn, rotate one or more components of a compressor section or a turbine section of a gas turbine engine) when the gas turbine engine is in a shutdown operating condition. Additionally, inclusion of the primary one-way clutch 220 within the turning unit 200 prevents a rotation of the accessory gears 106 of the accessory gearbox 100 from being transferred back through the turning unit 200 to the electric machine 202, e.g., during flight operations of the gas turbine engine wherein such components of the accessory gearbox 100 are rotating much more quickly than is desirable for the electric motor 202. Such a configuration may therefore increase a useful life of the turning unit 200.

Figure 5:
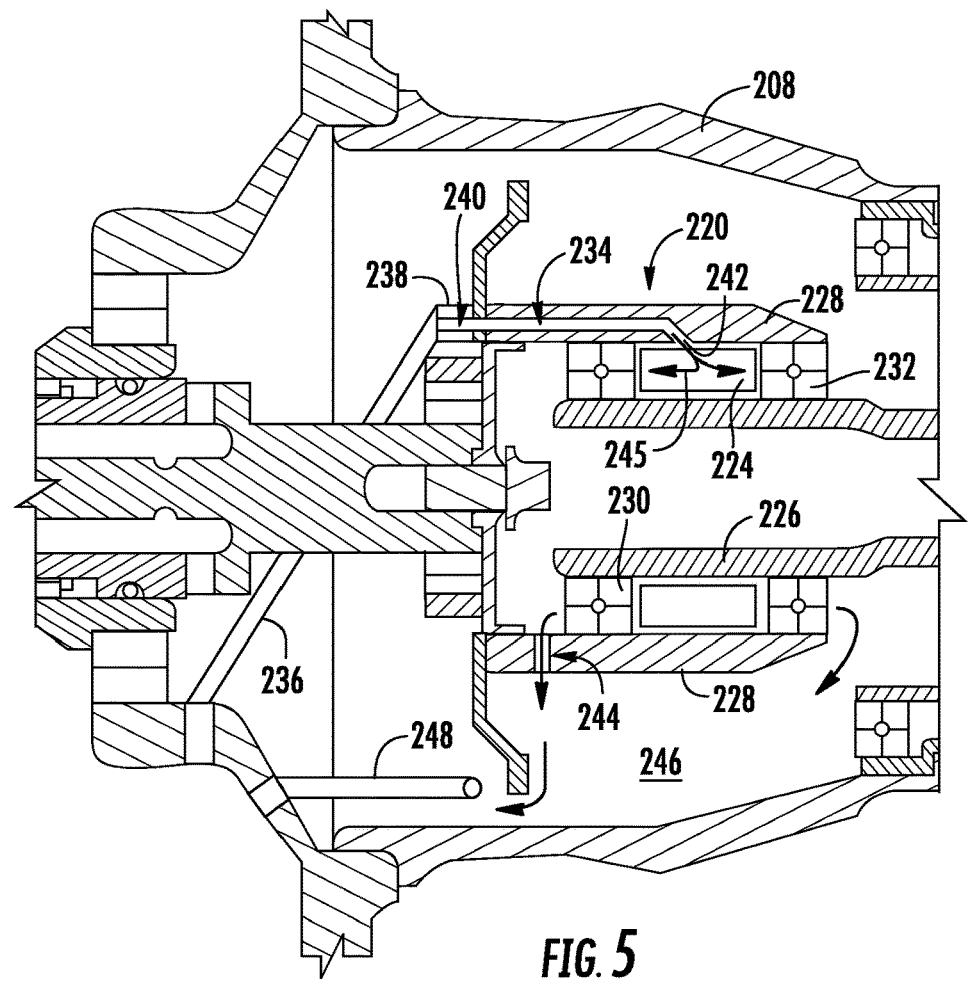
FIG. 5 is a close-up, cross-sectional view of a lubrication oil system of the exemplary turning unit of FIG. 2 in accordance with an exemplary embodiment of the present disclosure.

Referring still to FIG. 3, and now also briefly to FIG. 5, it will be appreciated that the turning unit 200 further includes a lubrication oil system for lubricating the primary one-way clutch 220. FIG. 5 provides a close-up, cross-sectional view of the primary one-way clutch 220 of the turning unit 200 of FIG. 3. As is depicted, the primary one-way clutch 220 generally includes a forward bearing 230 and an aft bearing 232 located forward and aft, respectively, of the plurality of sprags 224 of the primary one-way clutch 220. For the embodiment depicted, each of the forward and aft bearings 230, 232 are configured as ball bearings. However, in other embodiments, any other suitable bearing configuration may be provided.

Additionally, for the embodiment depicted, the lubrication oil system includes a lubrication oil delivery cavity 234 defined within the outer race 228 of the primary one-way clutch 220. A supply line 236 is also included providing lubrication oil to the lubrication oil delivery cavity 234 through a stationary to rotating connection member 238. The connection member 238 is a stationery member (i.e., stationary relative to the outer race 228) defining an opening 240 configured to align with the lubrication oil delivery cavity 234 defined within the outer race 228 and provide the lubrication oil thereto during operation. The supply line 236 may receive lubrication oil from a lubrication oil jet (not shown) within the accessory gearbox 100 of the gas turbine engine. Additionally, the lubrication oil delivery cavity 234 defines an outlet 242 immediately radially outward of the plurality of sprags 224, and between the forward and aft bearings 230, 232, such that the lubrication oil delivery cavity 234 may provide a flow 245 of lubrication oil to both the forward and aft bearings 230, 232 and sprags 224 during operation.

As is also depicted, the outer race 228 of the primary one-way clutch 220 further defines an outlet channel 244 configured to receive at least a portion of the flow 245 of lubrication oil and expel it to an outer cavity 246 within the turning assembly. The outer cavity 246 may in turn, provide such flow 245 of lubrication oil to an outlet line 248, which may return the lubrication oil to the accessory gearbox 100. Inclusion of a lubrication oil system in accordance with the present disclosure may ensure the plurality of bearings, including the forward and aft bearings 230, 232, of the primary one-way clutch 220 are provided with a desired amount of lubrication oil during operation. It should be appreciated, however, that in other exemplary embodiments, any other suitable lubrication oil system may be provided.

Referring back generally to FIGS. 2 and 3, it will be appreciated that the exemplary turning unit 200 depicted further includes a controller 282. The controller 282 is operably connected to the motor 202 of the turning unit 200, and is further operably connected to the power source for the motor 202, such as the ground power source 206. For the embodiment depicted, the controller 282 is operably connected to the motor 202 via a wired connection 284, and similarly, the ground power source 206 is electrically connected to the motor 202 via a wired connection 286. Moreover, for the embodiment depicted, the turning unit 200 includes a temperature sensor 288 positioned in or around the electric motor 202 for determining a temperature in or around the electric motor 202 (FIG. 3). The temperature sensor 288 is similarly operably connected to the controller 282 via, for the embodiment depicted, a wired connection 290.

As stated, the electric motor 202 is operable to rotate, through the output assembly 204, one or more components of the compressor section or the turbine section of the gas turbine engine at a relatively low rotational speed during a shutdown condition of the gas turbine engine. More specifically, for the embodiment depicted, the controller 282 is configured to operate the electric motor 202, such that the electric motor 202 is operable in such a manner. In at least certain exemplary aspects, rotating the gas turbine engine at the relatively low rotational speed during the shutdown condition of the gas turbine engine may include rotating the gas turbine engine substantially continuously for at least a predetermined amount of time (e.g., at least about one hour, such as at least about two hours, such as at least about five hours). The predetermined amount of time correlates to an expected amount of time for certain components of the gas turbine engine to cool sufficiently to reduce the likelihood of deformation. Additionally, or alternatively, rotating the gas turbine engine at the relatively low rotational speed during the shutdown condition of the gas turbine engine may include rotating the gas turbine engine in a pulsed or patterned manner for least the predetermined amount of time. For example, the controller 282 may be configured to operate the turning unit 200 to rotate the gas turbine engine for certain time intervals or patterns, including, for example: (a) thirty seconds on, thirty seconds off; (b) two minutes on, two minutes off; (c) ten seconds on, fifty seconds off; etc.

Moreover, for the embodiment depicted, the controller 282 may determine the gas turbine engine is in a shutdown condition based on a torque applied by the electric motor 202 through the turning unit 200 to the accessory gearbox 100. For example, if an amount of torque applied by the electric motor 202 is below a predetermined minimum threshold, the controller 282 may also determine that either the gas turbine engine is operating and rotating more quickly than would otherwise be rotated by the electric motor 202, or alternatively that there has been a failure. Similarly, if an amount of torque applied by the electric motor 202 is above a predetermined maximum threshold, the controller 282 may also determine that there has been a failure. However, if the amount of torque applied by the electric motor 202 is above the predetermined minimum threshold and below the predetermined maximum threshold, the controller 282 may determine the turning unit 200 is operating as desired to rotate the gas turbine engine at a relatively low rotational speed during a shutdown condition of the gas turbine engine.

Inclusion of a turning unit in accordance with one or more exemplary embodiments of the present disclosure may therefore increase a useful life of a gas turbine engine with which it is installed, by reducing a likelihood of certain components deforming subsequent to flight operations due to the relatively high temperatures to which the components are exposed and the weight of the components being supported. Notably, although the turning unit 200 is described herein as a device to prevent or minimize a likelihood of certain components deforming subsequent to flight operations, in certain exemplary embodiments, the turning unit may additionally, or alternatively, be used during inspection of the gas turbine engine through its borescope holes. With such a configuration, the turning unit may instead be permanently installed on the accessory gearbox at any suitably location on the accessory gearbox (such as a dedicated crank point).

Figure 6:
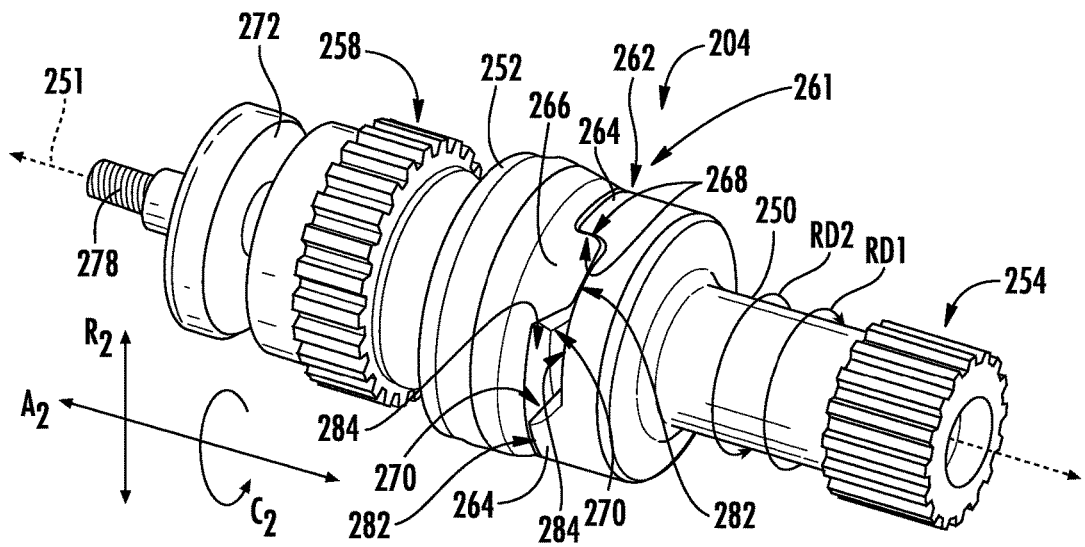
FIG. 6 is a perspective view of an output assembly of the exemplary turning unit of FIG. 2 in accordance with an exemplary embodiment of the present disclosure.
Figure 7:
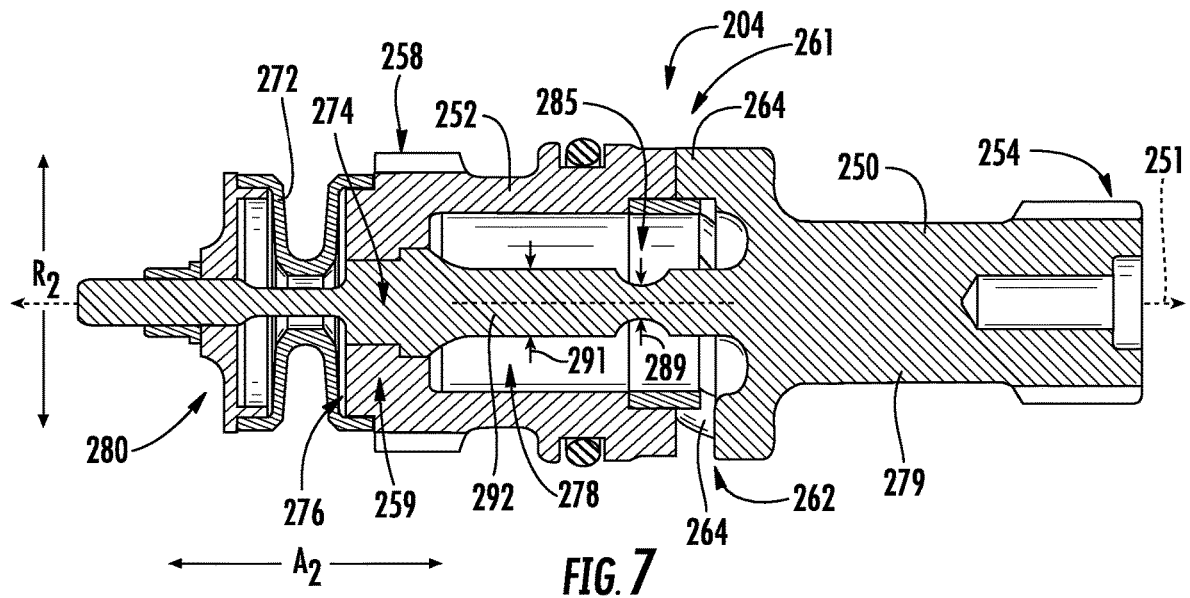
FIG. 7 is a side, cross-sectional view of the exemplary output assembly of FIG. 6.

Referring now to FIGS. 6 and 7, an output assembly 204 is provided in accordance with an exemplary embodiment of the present disclosure. FIG. 6 provides a perspective view of the exemplary output assembly 204, and FIG. 7 provides a side, cross-sectional view of the output assembly 204.

For example, the exemplary output assembly 204 may be configured in substantially the same manner as the exemplary output assembly 204 described above with reference to, e.g., FIGS. 2, 3, and 5. Accordingly, the exemplary output assembly 204 may be configured to transfer a rotational torque and power provided by an accessory system of the gas turbine engine to an accessory gearbox 100 of the gas turbine engine, or more particularly, to an accessory gear 106 of the accessory gearbox 100 of the gas turbine engine. In certain embodiments, the accessory system may be the exemplary turning unit 200 described above, in which case, the output assembly 204 may be configured to transfer rotational torque and power provided by the electric motor 202 (across the reduction gearbox 218 and the primary one-way clutch 220) to the gas turbine engine via the accessory gearbox 100. However, in other embodiments, the exemplary output assembly 204 of FIGS. 6 and 7 may be utilized with any other suitable accessory system (such as a starter motor, etc.).

The exemplary output assembly 204 depicted generally defines an axial direction A2 extending along an axis 251 of the output assembly 204, a radial direction R2, and a circumferential direction C2. As is depicted, the output assembly 204 generally includes a first rotating member 250 extending along the axis 251 and a second rotating member 252 also extending along the axis 251. The first rotating member 250 includes a mechanical connector for coupling the output assembly 204 to the accessory system. For the embodiment depicted, the mechanical connector is configured as a spline 254 configured to mesh with a spline, or splined coupling, of the accessory system. For example, when utilized with the exemplary turning unit 200 described above, the spline 254 of the first rotating member 250 is configured to mesh with a splined coupling 256 rigidly connected to the outer race 228 of the primary one-way clutch 220 (see FIG. 3). Similarly, the second rotating member 252 includes a mechanical connector for coupling the output assembly 204 to the accessory gearbox, or more specifically, to an accessory gear 106 of the accessory gearbox 100. Also for the embodiment depicted, the mechanical connector of the second rotating member 252 is configured as a spline 258 configured to mesh with a spline, or splined coupling 260, of the accessory gear 106 of the accessory gearbox 100 (see, e.g., FIG. 3). Accordingly, the first rotating member 250 is configured to mechanically couple the output assembly 204 to the accessory system, while the second rotating member 252 is configured to mechanically couple the output assembly 204 to the accessory gearbox.

As may be seen most clearly in FIG. 7, the second rotating member 252 is coupled to the first rotating member 250 at a first axial position 259 and at a second axial position 261. The first and second axial positions 259, 261 are spaced from one another along the axial direction A2 of the output assembly 204. For the embodiment depicted, the second rotating member 252 is slidably coupled to the first rotating member 250 at the first axial position 259, such that the connection permits movement of the second rotating member 252 relative to the first rotating member 250 along the axial direction A2 of the output assembly 204. For example, the connection may be a splined connection, or any other suitable connection allowing for relative movement along the axial direction A2. Accordingly, it will be appreciated that although the connection allows for movement along the axial direction, A2, the connection restricts any movement of the first rotating member 250 relative to the second rotating member 252 along the circumferential direction C2. Therefore, a rotational torque and power may be transferred from the second rotating member 252 to the first rotating member 250 (and vice versa) through the connection at the first axial position 259.

By contrast, the second rotating member 252 is coupled to the first rotating member 250 at the second axial position 261 through a one-way clutch 262. As is depicted, the one-way clutch 262 is formed at least in part by the first rotating member 250 and at least in part by the second rotating member 252. More specifically, for the embodiment depicted, the one-way clutch 262 is configured as a one-way dog clutch, also referred to simply as a "dog clutch". More specifically, for the embodiment depicted the auxiliary one-way clutch 262 is formed of a plurality of teeth 264 of the first rotating member 250 and a plurality of teeth 266 of the second rotating member 252. Each of these plurality of teeth 264, 266 include a first, active engagement end 268 and a second, passive end 270. The first and second ends 268, 270 are positioned at opposite sides of the respective teeth 264, 266 along the circumferential direction C2 of the output assembly 204. The first, active engagement ends 268 are each substantially aligned with the axial direction A2 of the output assembly 204 (i.e., with a plane defined by the axial direction A2 and the radial direction R2), such that the first end 268 of a tooth 264 on the first rotating member 250 may transfer power and torque to the first end 268 of a tooth 266 on the second rotating member 252. By contrast, the second, passive ends 270 are slanted with respect to the axial direction A2 of the output assembly 204 (i.e., define an angle with a plane defined by the axial direction A2 and the radial direction R2, such as an angle greater than about twenty degrees), such that the second end 270 of a tooth 264 on the first rotating member 250 may not transfer any substantial amount of power or torque to the second end 270 of a tooth 266 of the second rotating member 252. Or, more notably, the second end 270 of a tooth 266 on the second rotating member 252 may not transfer any substantial amount of power or torque to the second end 270 of a tooth 264 on the first rotating member 250.

For example, the output assembly 204 defines a first rotational direction RD1 along the circumferential direction C2 and a second (and opposite) rotational direction RD2 along the circumferential direction C2. The first rotational direction RD2 may be a clockwise rotational direction (as viewed from an end of the first rotating member 250) and the second rotational direction RD2 may be a counterclockwise rotational direction, each being opposite one another along the circumferential direction C2. During operation of the accessory system, the accessory system may rotate the first rotating member 250 in the second rotational direction RD2, such that the spline 254 is the driving member and the spline 258 is the driven member. By contrast, during operation of the gas turbine engine, the accessory gearbox 100 may rotate the second rotating member 252 in the second rotational direction RD2, such that the spline 258 is the driving member, and the spline 254 is the driven member.

When the first rotating member 250 is rotated in the second rotational direction RD2 by the accessory system, the engagement ends 268 of the teeth 264, 266 of the one-way dog clutch 262 engage one another to transfer a power and torque between the first and second rotating members 250, 252. By contrast, when the second rotating member 252 is rotated in the second rotational direction RD2 by the accessory gearbox 100, the passive ends 270 of the teeth 264, 266 of the one-way clutch 262 are urged towards one another. For example, in such a scenario, and after a designed to fail point of the output assembly 204 (discussed below) is broken, the passive ends 270 of the teeth 264, 266 of the one-way clutch 262 are pressed against one another, and may move past one another, such that no substantial amount of power and/or torque may be transferred between the first and second rotating members 250, 252 (e.g., less than about 1 Newton-meter).

Referring still to FIGS. 6 and 7, the exemplary output assembly 204 further includes a spring member 272, which for the embodiment depicted, is coupled (or more specifically, is rigidly coupled) to the first rotating member 250. More specifically, for the embodiment depicted, the second rotating member 252 defines an opening 274 along the axial direction A2 at the first axial position 259. Additionally, the first rotating member 250 includes an extension member 278 extending from a body section 279 and generally along the axial direction A2 at least partially between the first axial position 259 and the second axial position 261. Further, for the embodiment depicted, the extension member 278 further extends through the opening 274 defined by the second rotating member 252. The spring member 272 of the output assembly 204 is attached to the extension member 278 at a third axial position 280, the third axial position 280 being spaced from the first axial position 259 along the axial direction A2. The spring member 272 extends to the second rotating member 252 at a distal end 276 of the second rotating member 252, pressing the teeth 266 of the second rotating member 252 towards the teeth 264 of the first rotating member 250. As previously discussed, the second rotating member 252 is, for the embodiment depicted, slidably attached to the first rotating member 250 at the first axial position 259, such that the spring member 272 presses together the one-way clutch 262 formed by the first and second rotating members 250, 252.

Notably, with such an exemplary embodiment, the spring member 272 creates a resistance for the one-way clutch 262 when moved in a passive direction (e.g., when the second rotating member 252 is moved in the second rotational direction RD2 by the accessory gearbox 100). More specifically, each of the teeth 264, 266 include a distal end surface 282 configured to contact a recessed surface 284 of the opposing side of the one-way dog clutch 262. The pressing of these two surfaces 282, 284 together by, e.g., the spring member 272, creates a resistance that must be overcome in order to rotate the first rotating member 250 relative to the second rotating member 252 in the passive direction.

Furthermore, as briefly noted above, and referring specifically to FIG. 7, the output assembly 204 further includes a designed fail point 285. More particularly, the extension member 278 includes the designed fail point 285. The designed fail point 285 is, for the embodiment depicted, configured as a shear neck. As used herein, the term "shear neck" refers to a position on the extension member 278 defining a minimum diameter. For the embodiment depicted, a diameter 289 of the shear neck is at least about ten percent less than a diameter 291 of a body portion 292 of the extension member 278. For example, in certain embodiments, the diameter 289 of the shear neck may be at least about fifteen percent less, such as at least about twenty percent less, such as at least about twenty-five percent less, and up to about ninety percent less than the diameter 291 of the body portion 292 of the extension member 278. It should be appreciated, however, that in other embodiments, the designed fail point 285 may instead have any other suitable configuration. For example, in other exemplary embodiments, designed fail point 285 may instead be a position on the extension member 278 having a plurality of holes or voids therein to reduce a torque limit of such portion of the extension member 278.

It will be appreciated that inclusion of the designed fail point 285 in the extension member 278 of the first rotating member 250 may ensure that no more than a minimum amount of torque is transferred from the accessory gearbox 100 to the accessory system. More particularly, the output assembly 204 is designed to allow for relatively high amount of torque to be transferred when rotated in one manner (e.g., when the accessory system rotates the first rotating member 250 in the second rotational direction RD2), while preventing such high amount of torque to be transferred when rotated in another manner (e.g., when the accessory gearbox 100 rotates the second rotating member 252 in second rotational direction RD2). For example, the exemplary output assembly 204 depicted defines two separate torque paths when rotating in the second rotational direction RD2—a first in which the spline 254 is the driving member and a second in which the spline 258 is the driving member. More specifically, the first torque path extends from the spline 254 of the first rotating member 250, through the one-way clutch 262 to the second rotating member 252 (more specifically, through the engagement ends 268 of the teeth 264, 266 of the one-way clutch 262), and through spline 258 of the second rotating member 252. The second torque path extends primarily from the spline 254 of the first rotating member 250, through the extension member 278 of the first rotating member 250 (and through the designed fail point 285), through the connection of the first and second rotating members 250, 252 at the first axial position 259 to the second rotating member 252, and through the spline 258 of the second rotating member 252. Notably, a portion of the second torque path also extends through the one-way clutch in the form of friction resistance between the surfaces 282, 284 described above. The output assembly 204 defines a first torque limit through the first torque path and a second torque limit through the second torque path. The second torque limit is set mainly by the designed fail point 285. Accordingly, for example, the output assembly 204 may accommodate a torque transfer in an amount up to the first torque limit when the first rotating member 250 is rotated in the second rotational direction RD2 by the accessory system (in which the spline 254 is the driving member) and may accommodate a torque transfer an amount up to the second torque limit when the second rotating member 252 is rotated in the second rotational direction RD2 by an accessory gear 106 of an accessory gearbox 100 (in which the spline 258 is the driving member).

It will be appreciated that the first torque limit is greater than the second torque limit. For example, the second torque limit may be at least about twenty-five percent lower than the first torque limit, such as at least about thirty-five percent lower, such as at least about fifty percent lower, such as at least about sixty percent lower, and up to about ninety-nine percent lower than the first torque limit.

As stated, the second torque limit is set mainly by the designed fail point 285. More specifically, the second torque limit is set by the designed fail point 285 and the friction between the surfaces 282, 284. In at least certain exemplary embodiments, the designed fail point 285 defines a torque limit between about thirty (30) Newton-meters and about one (1) Newton-meter. For example, in certain embodiments, the designed fail point 285 may define a torque limit less than about twenty-five Newton-meters, such as less than about twenty Newton-meters. The overall second torque limit may be within about one Newton-meter of the torque limit of the designed fail point 285. By contrast, the first torque limit may be greater than the second torque limit. For example, the first torque limit may be greater than thirty Newton-meters, such as greater than about fifty Newton-meters, such as greater than about seventy-five Newton-meters, such as greater than about one hundred Newton-meters, and up to about 5,000 Newton-meters.

Inclusion of an output assembly to mechanically couple the accessory system to an accessory gearbox of the gas turbine engine in accordance with an embodiment of the present disclosure may ensure that undesirable, relatively high rotational speeds and/or torques of the accessory gearbox are not transferred to the accessory system. Such may increase a longevity of the accessory system.

Figure 8:
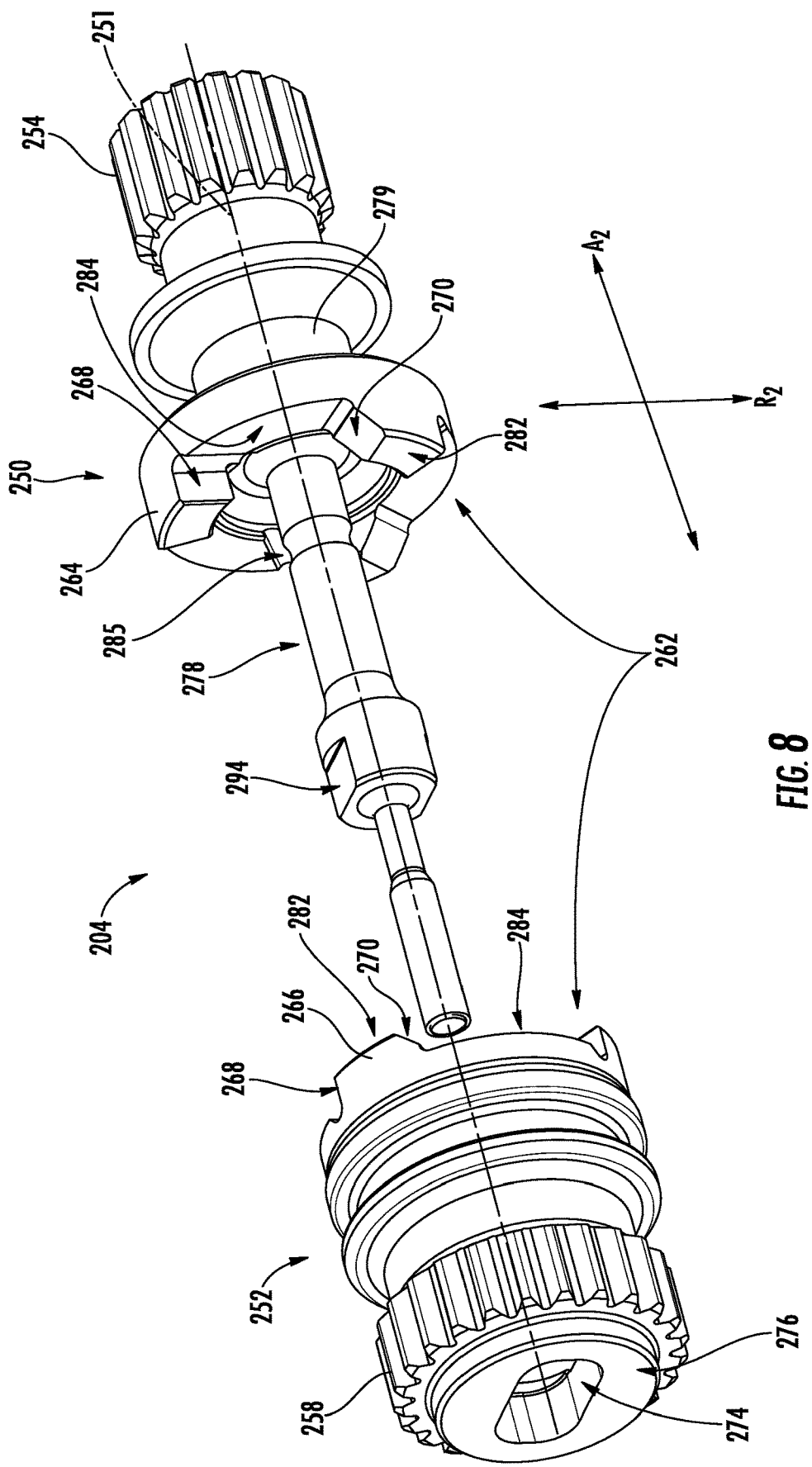
FIG. 8 is an exploded view of an output assembly in accordance with an exemplary embodiment of the present disclosure.
Figure 9:
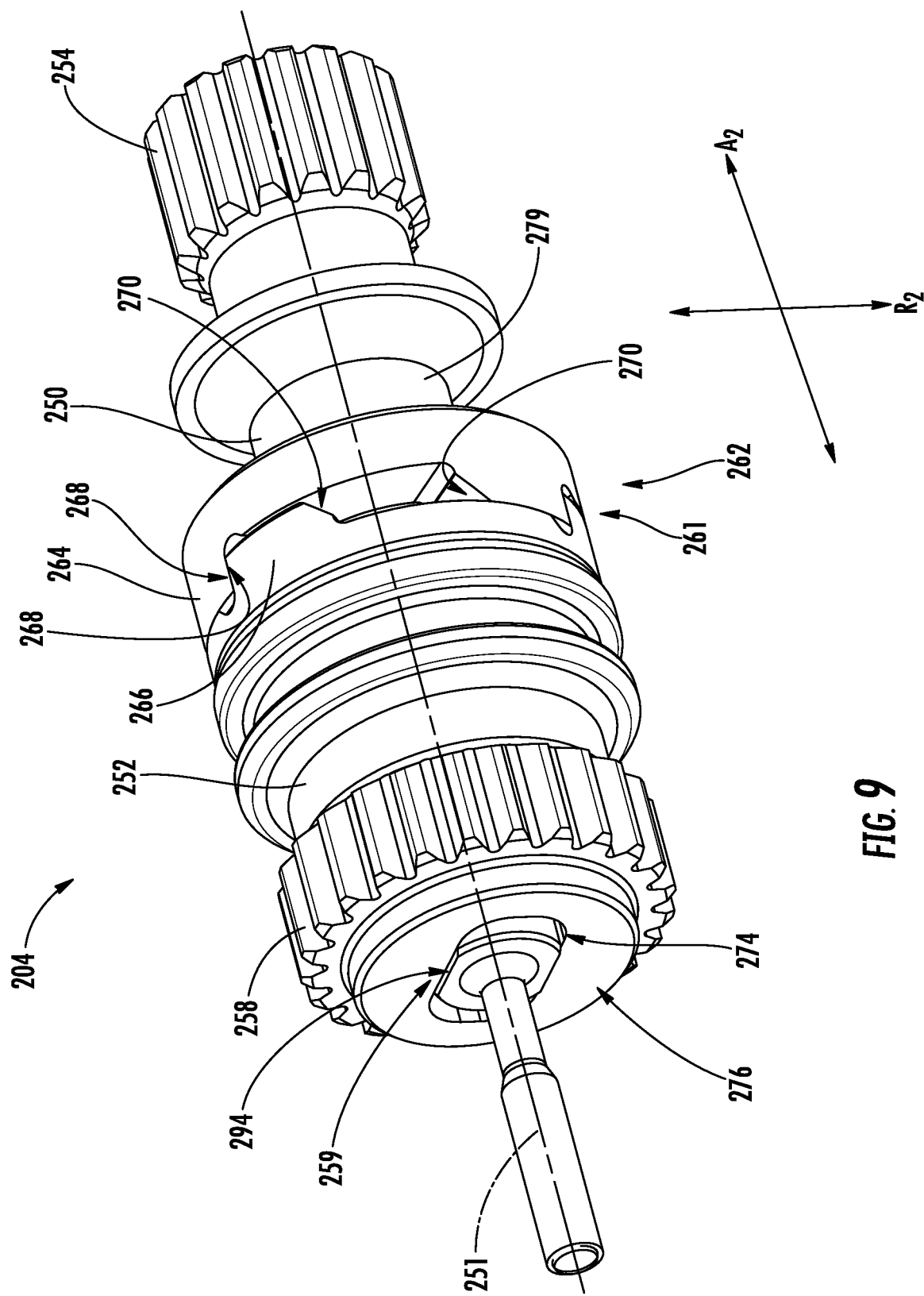
FIG. 9 is an assembled view of the exemplary output assembly of FIG. 8.

It should be appreciated, however, that in other exemplary embodiments, any other suitable configuration may be provided for the output assembly 204. For example, referring now to FIGS. 8 and 9, an output assembly 204 in accordance with another exemplary embodiment of the present disclosure is depicted. FIG. 8 provides an exploded view of the exemplary output assembly 204 and FIG. 9 provides an assembled view of the exemplary output assembly 204. It will be appreciated that the exemplary output assembly 204 of FIGS. 8 and 9 may be configured in substantially the same manner as the exemplary output assembly 204 of FIGS. 6 and 7. Accordingly, the same numbering may refer to the same similar parts.

For example, the exemplary output assembly 204 of FIGS. 8 and 9 generally includes a first rotating member 250 and a second rotating member 252. The second rotating member 252 is coupled to the first rotating member 250 at a first axial position 259 and at a second axial position 261. The second rotating member 252 is coupled to the first rotating member 250 at the second axial position 261 through a one-way clutch 262. By contrast, the second rotating member 252 is slidably coupled to the first rotating member 250 at the first axial position 259, such that the connection permits movement of the second rotating member 252 relative to the first rotating member 250 along the axial direction A2 of the output assembly 204.

However, for the embodiment depicted, the slidable connection between the second rotating member 252 and the first rotating member 250 is provided by an extension member 278 including two opposing substantially flat surfaces 294 and an opening 274 at a distal end 226 of the second rotating member 252 being an elongated opening having a shape corresponding to the opposing substantially flat surfaces 294 of the extension member 278 of the first rotating member 250. In such a manner, the first rotating member 250 may be slidable relative to the second rotating member 254 along the axial direction A2, without being rotatable relative to one another at the first axial position 259. Notably, the output assembly 204 of FIGS. 8 and 9 is depicted without a spring member 272 for clarity.

Figure 10:
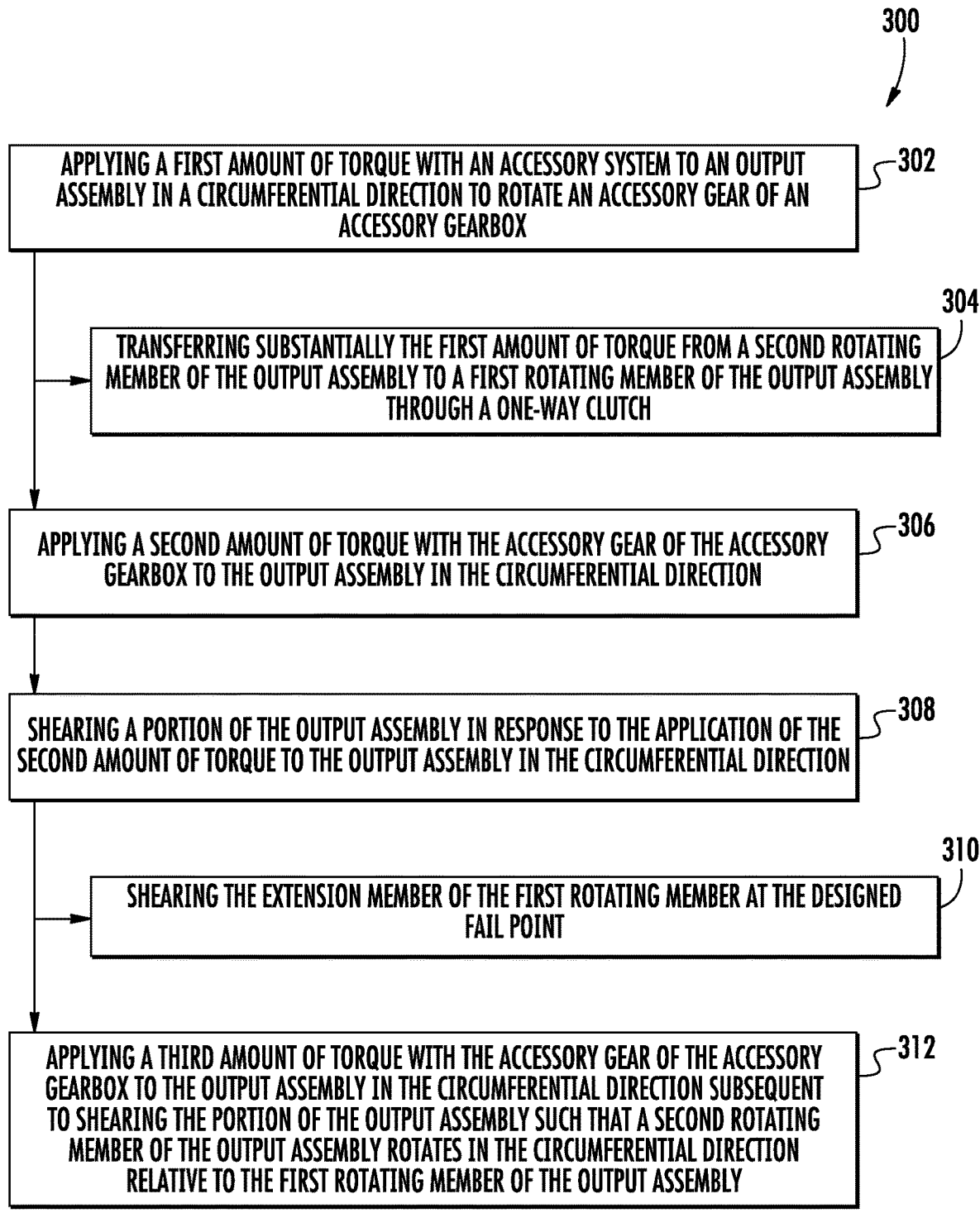
FIG. 10 is a flowchart of a method for operating a gas turbine engine in accordance with an exemplary aspect of the present disclosure.

Referring now to FIG. 10 a flow diagram is provided of a method 300 for operating an accessory system of the gas turbine engine. The method 300 may be utilized in certain exemplary aspects with one or more of the exemplary gas turbine engines, accessory systems, and/or output assemblies described above with reference to FIGS. 1 through 9. Accordingly, the gas turbine engine may generally include a compressor section, a combustion section, a turbine section, an accessory gearbox, an accessory system, and an output assembly. The accessory gearbox may be attached to, e.g., a core turbine engine of the gas turbine engine.

The exemplary method generally includes at (302) applying a first amount of torque with an accessory system to an output assembly in a circumferential direction to rotate an accessory gear of an accessory gearbox. For the embodiment depicted, applying the first amount of torque with the accessory system to the output assembly at (302) includes at (304) transferring substantially the first amount of torque from a second rotating member of the output assembly to a first rotating member of the output assembly through a one-way clutch.

The exemplary method 300 additionally includes at (306) applying a second amount of torque with the accessory gear of the accessory gearbox to the output assembly in the circumferential direction (i.e., the same rotational direction as at step (302), such as a second circumferential direction; see FIGS. 6 and 7). The first and second amounts of torque are each greater than or equal to a torque limit, and more specifically, are each greater than or equal to a torque limit of a designed fail point of an extension member of the first rotating member. Additionally, for the embodiment depicted, the first amount of torque is greater than the second amount of torque.

The exemplary method 300 additionally includes at (308) shearing a portion of the output assembly in response to the application of the second amount of torque to the output assembly in the circumferential direction at (306). More particularly, for the exemplary aspect depicted, shearing the portion of the output assembly in response to the application of the second amount of torque with the accessory gear to the output assembly in the circumferential direction at (308) includes at (310) shearing the extension member of the first rotating member at the designed fail point. In certain exemplary aspects, the designed fail point may be a shear neck.

Further, the exemplary method 300 includes at (312) applying a third amount of torque with the accessory gear of the accessory gearbox to the output assembly in the circumferential direction subsequent to shearing the portion of the output assembly at (308) such that a second rotating member of the output assembly rotates in the circumferential direction relative to the first rotating member of the output assembly.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An output assembly for an accessory system of a gas turbine engine, the gas turbine engine comprising an accessory gearbox, the output assembly defining an axis and comprising:
   a first rotating member extending along the axis and comprising a mechanical connector for coupling the output assembly to the accessory system; and
   a second rotating member extending along the axis and comprising opposed first end and second end, the first end comprising an aperture, the second rotating member coupled to the first rotating member at a first axial position at the aperture of the first end and at a second axial position at the second end, the second rotating member coupled to the first rotating member at the second axial position through a one-way clutch;

wherein the first rotating member further comprises an extension member, the first rotating member and the extension member of unitary construction, the extension member extending at least between the second axial position and through the aperture of the first end at the first axial position, the extension member including a designed fail point.

2. The output assembly of claim 1, wherein the designed fail point is a shear neck.

3. The output assembly of claim 1, wherein the one-way clutch is formed at least in part by the first rotating member and at least in part by the second rotating member.

4. The output assembly of claim 3, wherein the one-way clutch is configured as a dog clutch.

5. The output assembly of claim 3, wherein the second rotating member defines an opening, wherein the extension member of the first rotating member extends through the opening, and wherein the output assembly further comprises a spring member attached to the extension member and pressing together the one-way clutch formed by the first and second rotating members.

6. The output assembly of claim 1, wherein the second rotating member comprises a mechanical connector for coupling the output assembly to the accessory gearbox.

7. The output assembly of claim 6, wherein the mechanical connector of the first rotating member is configured as a spline, and wherein the mechanical connector of the second rotating member is also configured as a spline.

8. The output assembly of claim 1, wherein the designed fail point defines a torque limit of less than about thirty Newton-meters.

9. The output assembly of claim 1, wherein the output assembly defines a first torque limit when the first rotating member is rotated in a first circumferential direction by the accessory system, wherein the output assembly defines a second torque limit when the second rotating member is rotated in the first circumferential direction by an accessory gear of the accessory gearbox, and wherein the first torque limit is greater than the second torque limit.

10. The output assembly of claim 9, wherein the first torque limit is greater than thirty Newton-meters, and wherein the second torque limit is less than thirty Newton-meters.

11. The output assembly of claim 1, wherein the second rotating member is slidably coupled along the axis to the first rotating member at the first axial position.

12. The output assembly of claim 1, wherein the extension member extends from a body section of the first rotating member.

13. A gas turbine engine comprising:
a compressor section and a turbine section;
an accessory gearbox mechanically coupled to one or more components of the compressor section or the turbine section; and
an output assembly for an accessory system of the gas turbine engine, the output assembly defining an axis and comprising
 a first rotating member extending along the axis and comprising a mechanical connector for coupling the output assembly to the accessory system; and
 a second rotating member extending along the axis and comprising a mechanical connector coupling the output assembly to the accessory gearbox, the second rotating member further comprising opposed first end and second end, the first end comprising an aperture, the second rotating member coupled to the first rotating member at a first axial position at the aperture of the first end and at a second axial position at the second end, the second rotating member coupled to the first rotating member at the second axial position through a one-way clutch;

wherein the first rotating member further comprises an extension member, the first rotating member and the extension member of unitary construction, the extension member extending at least between the second axial position and through the aperture of the first end at the first axial position, the extension member including a designed fail point.

14. The gas turbine engine of claim 13, wherein the designed fail point is a shear neck.

15. The gas turbine engine of claim 13, wherein the one-way clutch is formed at least in part by the first rotating member and at least in part by the second rotating member.

16. A method of operating an accessory system of a gas turbine engine comprising:
applying a first amount of torque with an accessory system to an output assembly in a circumferential direction to rotate an accessory gear of an accessory gearbox, wherein applying the first amount of torque with the accessory system to the output assembly comprises transferring substantially the first amount of torque from a first rotating member of the output assembly to a second rotating member of the output assembly through a one-way clutch;
applying a second amount of torque with the accessory gear of the accessory gearbox to the output assembly in the circumferential direction, the first and second amounts of torque each being greater than or equal to a torque limit; and
shearing a portion of the output assembly in response to the application of the second amount of torque to the output assembly in the circumferential direction, and wherein shearing the portion of the output assembly in response to the application of the second amount of torque with the accessory gear to the output assembly in the circumferential direction includes shearing an extension member of the first rotating member at a designed fail point, the first rotating member and the extension member of unitary construction, the extension member of the first rotating member extending at least between a second end of the second rotating member and through an aperture of a first end of the second rotating member, the aperture of the first end coupling the extension member of the first rotating member at a first axial position, the second end coupling the first rotating member at a second axial position, the first end and the second end of the second rotating member being opposed ends.

17. The method of claim 16, wherein the first amount of torque is greater than the second amount of torque.

18. The method of claim 16, wherein the designed fail point is a shear neck.

19. The method of claim 16, further comprising:
applying a third amount of torque with the accessory gear of the accessory gearbox to the output assembly in the circumferential direction subsequent to shearing the portion of the output assembly such that the second rotating member of the output assembly rotates in the circumferential direction relative to the first rotating member of the output assembly.

20. An output assembly for an accessory system of a gas turbine engine, the gas turbine engine comprising an accessory gearbox, the output assembly defining an axis and comprising:
- a first rotating member extending along the axis and comprising a mechanical connector for coupling the output assembly to the accessory system;
- a second rotating member extending along the axis, the second rotating member coupled to the first rotating member at a first axial position and at a second axial position, the second rotating member coupled to the first rotating member at the second axial position through a one-way clutch;
- wherein the first rotating member further comprises an extension member, the first rotating member and the extension member of unitary construction, the extension member extending at least partially between the first axial position and the second axial position, the extension member including a designed fail point; and wherein the output assembly defines an axial direction, and wherein the second rotating member has a distal end opposite an end of the second rotating member positioned at the second axial position, and wherein the extension member extends from a body section through the distal end of the second rotating member along the axial direction at the first axial position, and wherein a spring member is attached to the extension member at a third axial position, the first axial position being positioned between the second axial position and the third axial position along the axial direction.

* * * * *